US010969269B1

(12) United States Patent
Mazumdar et al.

(10) Patent No.: US 10,969,269 B1
(45) Date of Patent: Apr. 6, 2021

(54) REMOTE VIBRATION SENSING THROUGH OPAQUE MEDIA USING PERMANENT MAGNETS

(71) Applicant: National Technology & Engineering Solutions of Sandia, LLC, Albuquerque, NM (US)

(72) Inventors: Yi Chen Mazumdar, Albuquerque, NM (US); Martin Nemer, Albuquerque, NM (US); Anirban Mazumdar, Atlanta, GA (US); Bart G. van Bloemen Waanders, Albuquerque, NM (US); Carlton F. Brooks, Albuquerque, NM (US); Oksana Guba, Albuquerque, NM (US); Stephen D. Bond, Albuquerque, NM (US)

(73) Assignee: National Technology & Engineering Solutions of Sandia, LLC, Albuquerque, NM (US)

(*) Notice: Subject to any disclaimer, the term of this patent is extended or adjusted under 35 U.S.C. 154(b) by 239 days.

(21) Appl. No.: 16/169,168

(22) Filed: Oct. 24, 2018

(51) Int. Cl.
  *G01H 11/02* (2006.01)
  *G01B 7/14* (2006.01)
  *H01F 7/02* (2006.01)

(52) U.S. Cl.
  CPC .............. *G01H 11/02* (2013.01); *G01B 7/14* (2013.01); *H01F 7/021* (2013.01)

(58) Field of Classification Search
  CPC ............ G01H 11/02; H01F 7/021; G01B 7/14
  See application file for complete search history.

(56) References Cited

U.S. PATENT DOCUMENTS

| 5,834,649 A * | 11/1998 | Narai ...................... B06B 1/045 73/649 |
| 8,450,996 B2 * | 5/2013 | Foletto ................. G01R 25/005 324/174 |
| 2004/0162477 A1 * | 8/2004 | Okamura ............... A61B 5/415 600/409 |
| 2011/0226066 A1 * | 9/2011 | Anand ..................... G01B 7/20 73/777 |
| 2014/0355644 A1 * | 12/2014 | Gupta ...................... G01K 7/36 374/4 |
| 2017/0222532 A1 * | 8/2017 | Wang ..................... H02K 33/16 |
| 2019/0103822 A1 * | 4/2019 | Shinzato ............. H01L 41/0906 |
| 2020/0076288 A1 * | 3/2020 | Nerubenko ............... F03G 7/08 |

* cited by examiner

*Primary Examiner* — Dominic E Hawkins
(74) *Attorney, Agent, or Firm* — Yee & Associates, P.C.

(57) ABSTRACT

A method of sensing vibrations or displacements remotely is provided. Magnets are attached to vibrating objects or the vibrating objects themselves are magnetic. A number of magnetic sensors are placed a specified distance from the magnets. Vibrational displacement of the vibrating objects is determined according to a model that maps changes in magnetic field to vibrations or spatial displacements.

20 Claims, 14 Drawing Sheets

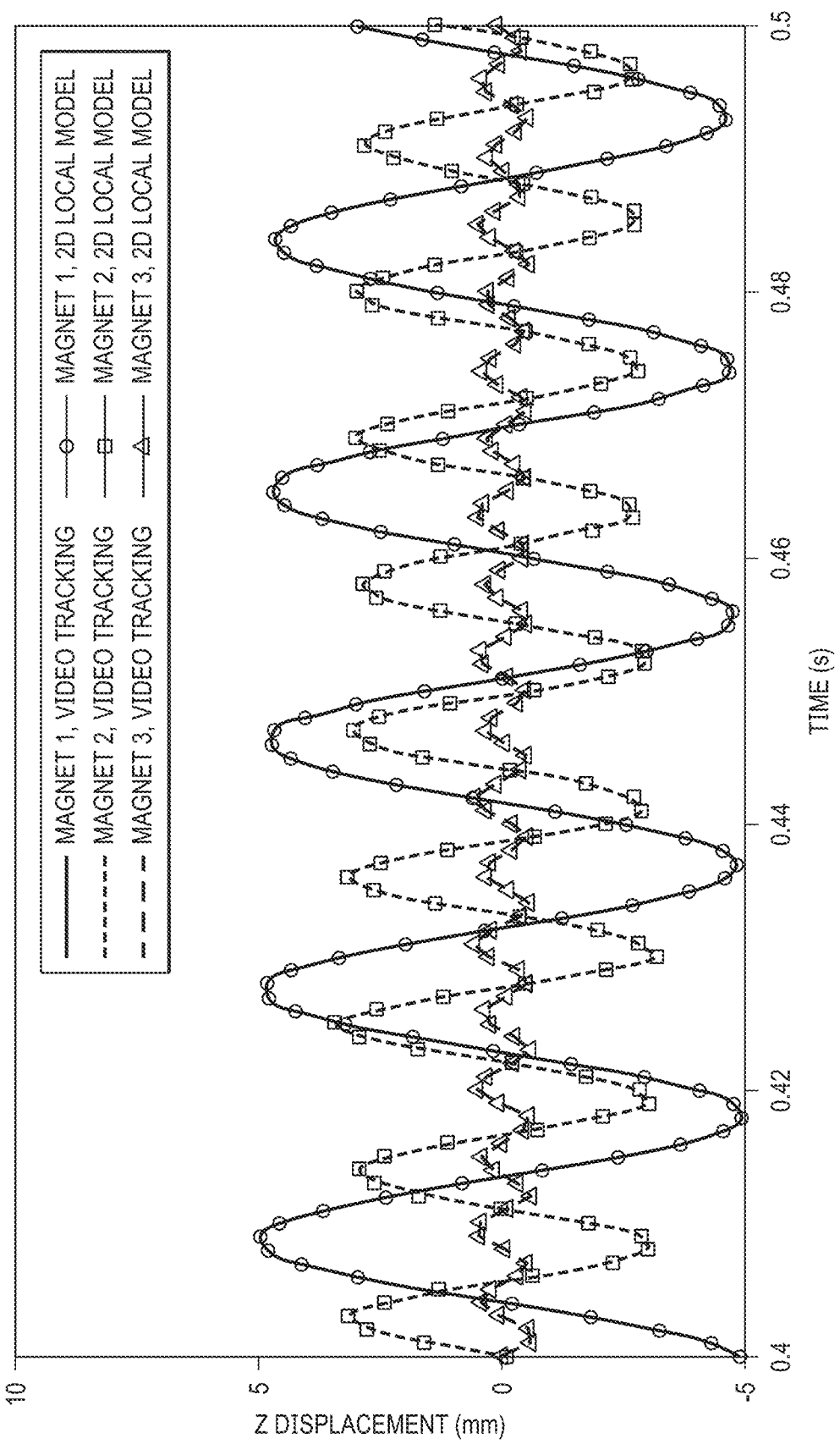

REMOTE VIBRATION SENSING THROUGH OPAQUE MEDIA USING PERMANENT MAGNETS

STATEMENT OF GOVERNMENT INTEREST

This invention was made with United States Government support under Contract No. DE-NA0003525 between National Technology & Engineering Solutions of Sandia, LLC and the United States Department of Energy. The United States Government has certain rights in this invention.

BACKGROUND

1. Field

The disclosure relates generally to vibration or displacement sensing, and more specifically to remote vibration sensing using magnetic fields from permanent magnets, ferromagnetic components, or paramagnetic components.

2. Description of the Related Art

Vibration sensing is valuable for characterizing the stiffness, performance, and aging characteristics of mechanical components including bridges, airplane wings, micro-structures, and composite materials. Understanding the modal characteristics has been shown to provide important information on the location and extent of structural damage. Vibrations can be sensed using acceleration, velocity, or displacement methods. Displacement methods, in particular remote displacement sensing methods, are interesting because they can provide absolute position and frequency-domain information with minimal cable-based constraint on the vibrating structure.

Wireless networking methods for vibration sensing have been utilized for large systems, but the size of existing wireless sensor systems can be prohibitive for smaller structures. Other existing non-contact displacement sensing methods include acoustic, radar, optical, capacitive, and inductive techniques. Acoustic methods are difficult to use for localizing displacements to specific areas, while optical image-based and laser-based techniques require visible access to the vibrating component. The presence of smoke and liquids or changes in the optical properties of air, such as those caused by shock waves, can distort optical measurements. Capacitive, inductive, and radar techniques cannot track multiple closely spaced components or track motions through conductive or reflective metal cases, e.g., for pressure vessel, bearing, gear box, vibrational switch, and engine block applications.

Magnetic particle tracking is a growing research area but is complicated by the nonlinear behavior of the magnetic field. Prior approaches involve tracking multiple permanent magnet positions, using permanent magnets for translation or rotation sensing, or imaging of magnetic fields. However, tracking errors on the order of the characteristic length of the permanent magnet or more have been observed when using the dipole model. This is due in part to the mismatch between the standard dipole model and the true magnetic field distribution. Errors of this magnitude are unacceptable for tracking fine motions and vibrations. Tracking small vibrations leads to unique problems which have not been addressed in the prior art. For instance, small errors in the estimated position of the component, stemming from unmodeled nonlinearities in the magnetic field, can also manifest as "false" higher order vibrational harmonics in the frequency domain. Therefore, alternative methods are required to obtain more accurate displacement values for vibration sensing applications.

SUMMARY

A method of sensing vibrations or displacements remotely is provided by attaching a number of magnets to a number of vibrating objects. A number of magnetic sensors are placed a specified distance from the magnets. The magnetic field sensors detect changes in magnetic field, and processors determine vibrational displacement of the vibrating objects according to a model that maps changes in magnetic field to vibrations or spatial displacements.

A method of sensing vibrations or displacements remotely is provided by positioning a number of magnetic, ferromagnetic, or paramagnetic vibrating objects. Alternatively, ferromagnetic or paramagnetic components can be placed on top of vibrating objects. A number of magnetic sensors are placed a specified distance from the vibrating objects. The magnetic field sensors detect changes in magnetic field, and processors determine vibrational displacement of the vibrating objects according to a model that maps changes in magnetic field to vibrations or spatial displacements.

DETAILED DESCRIPTION

The illustrative embodiments recognize and take into account one or more different considerations. For example, the illustrative embodiments describe magnetic field modeling techniques specifically for tracking vibrations. A calibrated local model technique is developed in order to mitigate the effect of un-modeled nonlinearities on vibrational harmonics in the frequency domain.

Figure 1:
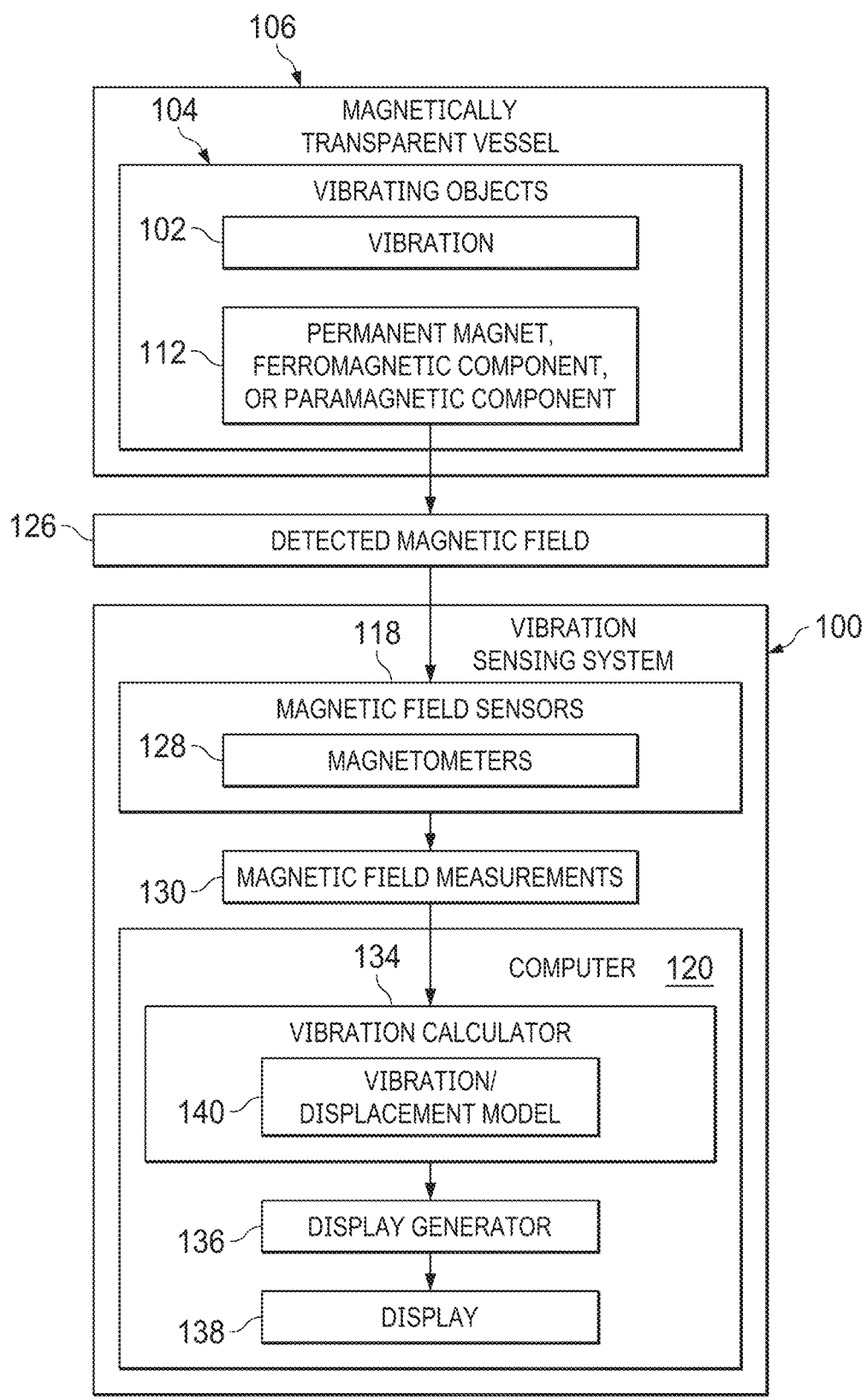
FIG. 1 is a block diagram of a sensing system for determining vibration or displacement according to changes in magnetic fields depicted in accordance with an illustrative embodiment.

Turning to FIG. 1, a block diagram of a sensing system for determining vibration or displacement according to changes in magnetic fields is depicted in accordance with an illustrative embodiment. The vibration sensing system 100 is configured to detect the vibration or displacement 102 of vibrating objects 104 in vessel 106.

Vessel 106 can be optically opaque but magnetically transparent. Magnetically transparent vessel 106 is transparent to magnetic fields. For example, the vessel may be constructed of aluminum, copper, brass, or austenitic stainless steel.

In accordance with an illustrative embodiment, vibrating objects 104 have permanent magnets, ferromagnetic components, or paramagnetic components 112 attached to them. Alternatively, the vibrating members 104 themselves can be magnetic, ferromagnetic, or paramagnetic.

Magnetic vibration sensing system 100 may comprise of magnetic field sensors 118 and computer 120.

Magnetic field sensors 118 may be configured to detect magnetic field 126, wherein detected magnetic field 126 is generated by permanent magnets, ferromagnetic components, or paramagnetic components 112 on vibrating members 104. For example, without limitation, magnetic field sensors 118 can comprise magnetometers 128. Information regarding detected magnetic field 126 detected by magnetic field sensors 118 can be provided as magnetic field measurements 130 to computer 120.

Computer 120 can be implemented using any appropriate information processing system. Computer 120 can be configured using any appropriate hardware or hardware in combination with software to implement vibration/displacement calculator 134, display generator 136, and display 138.

Vibration/displacement calculator 134 is configured to determine the vibration or spatial displacement 102 of the vibrating objects 104 in vessel 106 based on magnetic field measurements 130 provided by magnetic field sensors 118 using a vibration/displacement model 140.

The illustration of vibration sensing system 100 in FIG. 1 is not meant to imply physical or architectural limitations to the manner in which illustrative embodiments may be implemented. Other components, in addition to or in place of the ones illustrated, may be used. Some components may be optional. Also, the blocks are presented to illustrate some functional components. One or more of these blocks may be combined, divided, or combined and divided into different blocks when implemented in an illustrative embodiment.

Figure 2:
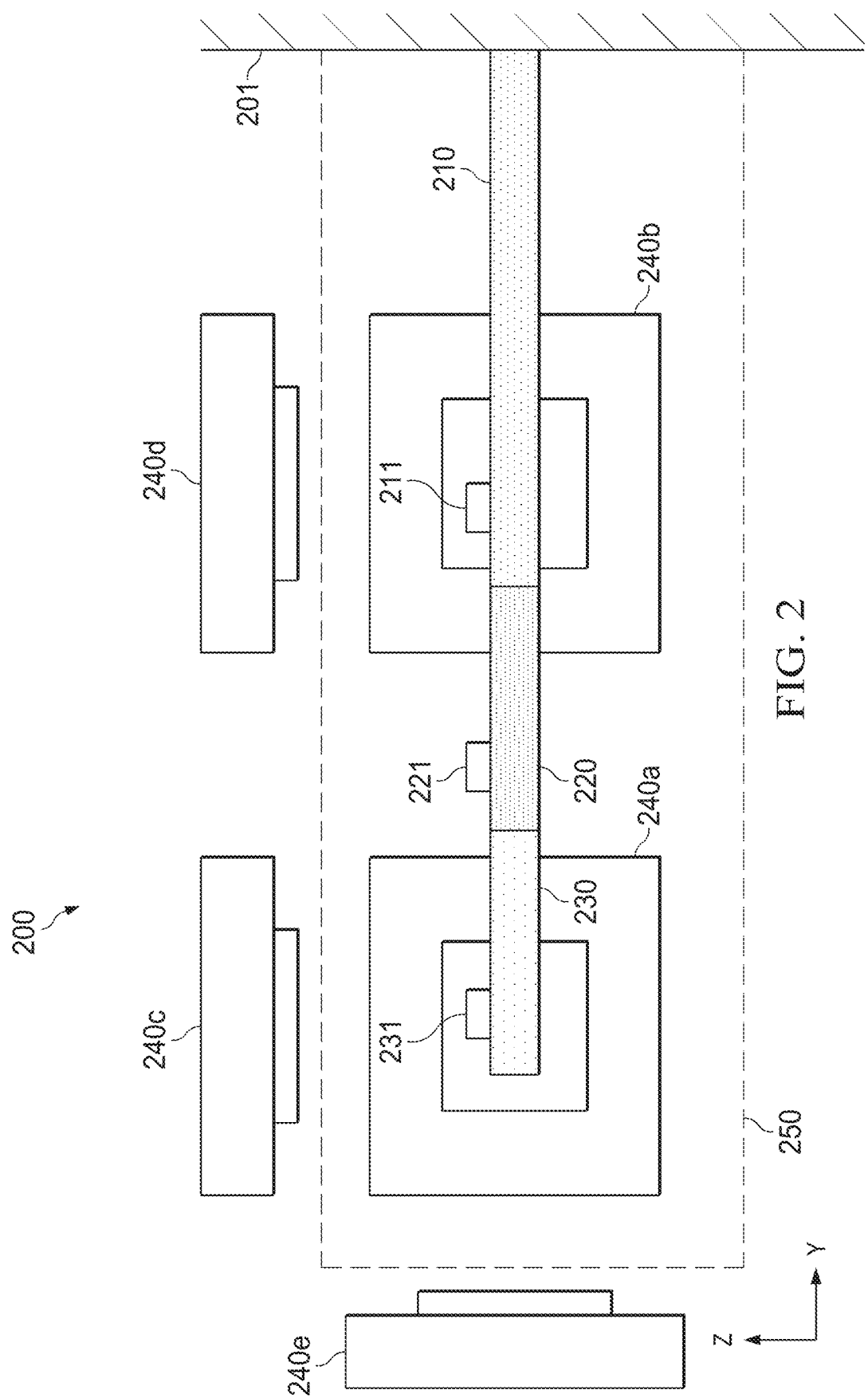
FIG. 2 is a diagram depicting a side view of a vibrating sensing system in accordance with illustrative embodiments.
Figure 3:
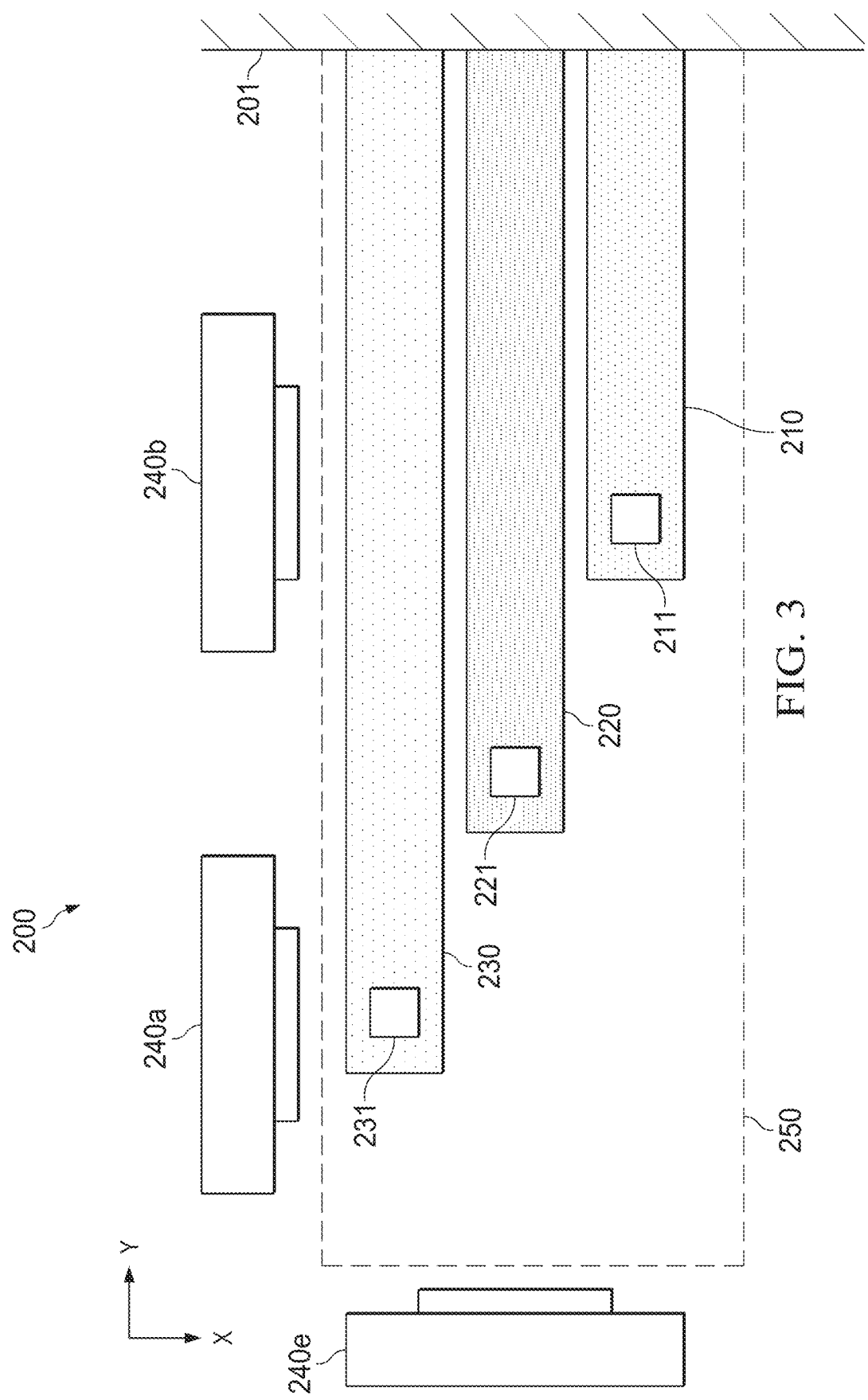
FIG. 3 is a diagram depicting a top view of a vibrating sensing system in accordance with illustrative embodiments.

FIG. 2 is a diagram depicting a side view of a vibrating sensing system in accordance with illustrative embodiments. FIG. 3 is a diagram depicting a top view of a vibrating sensing system in accordance with illustrative embodiments. System 200 comprises three vibrating members 210, 220, 230 connected to a fixed base 201. Each vibrating member has a permanent magnet 211, 221, 231, respectively, attached to it. Alternatively, trackable ferromagnetic or paramagnetic components can be placed on vibrating objects. In other implementations, the vibrating members 210, 220, 230 can themselves be magnetic, ferromagnetic or paramagnetic.

In this illustrative embodiment, the vibrating members 210, 220, 230 and magnets 211, 221, 231 are contained in a vessel 250 that is magnetically transparent but can be optically opaque.

A number of three-axis magnetic sensors 240a-240e are positioned outside the vessel 250. These sensors can comprise three-axis sensors such as sensor 410 shown in FIG. 4. In this illustrative example, two sensors 240a, 240b are positioned along one side of the vibrating members 210, 220, 230 and vessel 250 on the Y axis as shown in FIGS. 2 and 3. Another two sensors 240c, 240d are positioned along the top of the vibrating members 210, 220, 230 and vessel 250 along the Y axis as shown in FIG. 2. (For ease of illustration, sensors 240c and 240d are omitted from the view shown in FIG. 3). A fifth sensor 240e is positioned opposite the free ends of the vibrating members 210, 220, 230.

Different types of hardware can be used to implement the system described in FIGS. 2 and 3. An illustrative embodiment uses custom magnetic sensor boards with three-axis Honeywell HMC1053 sensors. Each axis has a Wheatstone bridge for measuring the change in magnetoresistance of a Permalloy film. These sensors have a bandwidth greater than 5 MHz and can measure field magnitudes up to ±6 G at a resolution of 120 µG. The sensors are connected via twisted-pair cable to a custom board that interfaces with a 16-bit PXI-6255 data acquisition card and a NI-PXIe-1073 chassis with differential analog measurement channels. The sensors are attached to a sensor rig via aluminum and plastic components to minimize field steering. The rig is attached to linear motion stages (Newport LTA-HS and PR50PP stages with Newport ESP301-3G motion controller) to enable x-, y-, and z-direction scanning for magnetic field calibrations. During calibrations, the sensor rig can be scanned and the vibrating components can be fixed, or vice versa.

In an embodiment, magnets 211, 221, 231 can be small cylindrical N52 grade Nd—Fe—B magnets with a diameter and length of 3.175 mm. Vibrating members 210, 220, 230 can comprise aluminum 6061 beams with a thickness of 0.79 mm, width of 10 mm, and length of 50.8, 76.2 and 101.6 mm, respectively.

An example of using vibration/displacement model 140 to determine vibration or displacement 102 of vibrating objects 104 in vessel 106 can be described using a simple dipole model to serve as a preliminary model for mapping geometry and changes in the magnetic field to vibration.

Figure 4:
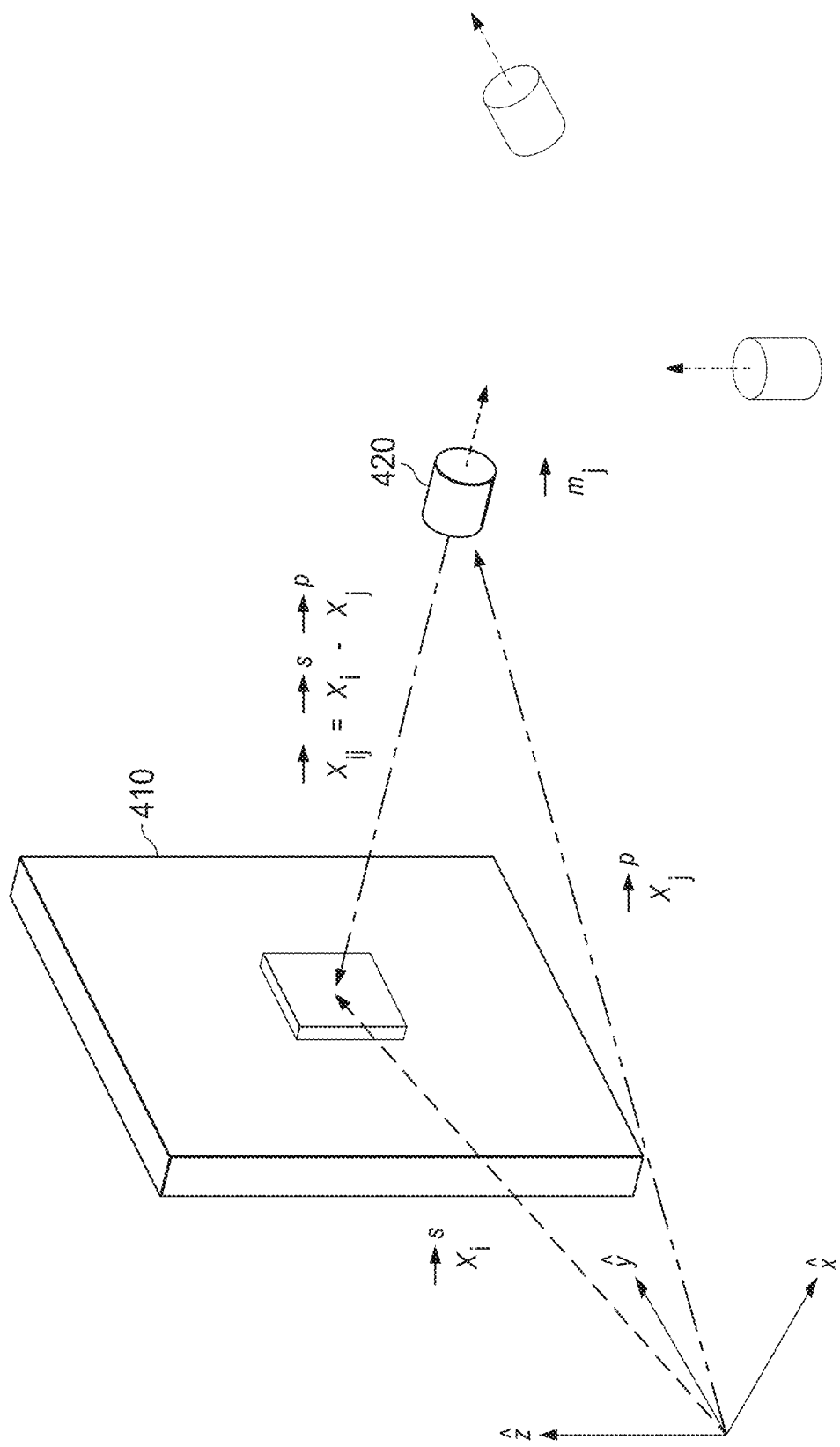
FIG. 4 depicts a three-axis magnetic sensor with which illustrative embodiments can be implemented.

FIG. 4 depicts a three-axis magnetic sensor 410 with which illustrative embodiments can be implemented. It also illustrates coordinate system conventions for mapping the motion of several small cylindrical magnets 420. The process begins by defining an ensemble of permanent magnetic field particles i=1, . . . , J located at positions $\vec{x}_j^P = (\vec{x}_{jx}^P, \vec{x}_{jy}^P, \vec{x}_{jz}^P)^T$ with normalized orientations $\vec{m}_j = (\vec{m}_{jx}, \vec{m}_{jy}, \vec{m}_{jz})^T$ and magnetic field sensors i=1, . . . , I located at positions $\vec{x}_i^s = (\vec{x}_{ix}^s, \vec{x}_{iy}^s, \vec{x}_{iz}^s)^T$. The magnetic field from the residual induction of a single particle on a single sensor using a simple dipole model can be approximated as $$\vec{B}_{ij} = B_j \left( \frac{3(\vec{m}_j \cdot \vec{x}_{ij})}{R_{ij}^5} - \frac{\vec{m}_j}{R_{ij}^3} \right)$$

where $\vec{x}_{ij}, \vec{x}_{iy}^s, \vec{x}_{iz}^s)^T$ is the relative position, $R_{ij} = \|\vec{x}_i^s - \vec{x}_j^P\|$ is the distance.

The magnetic field at room temperature is $$B_j \approx \frac{\mu_0}{4\pi} \mu_r M_0 V_j$$

where $M_0$ is the uniform magnetization, $\mu_r$ is the relative permeability, $\mu_0$ is the magnetic vacuum permeability, and $V_j$ is the volume of the magnet. The total contribution of J magnets on sensor i is $\vec{B}_i = \Sigma \vec{B}_{ij} + \vec{C}_i$ where $\vec{C}_i$ are offset constants from fixed external magnetic fields like the magnetic field of the earth.

If the sensor locations are known, then the magnetic field measurements $Y_i$ and calibrated offset constants $\vec{C}_i$ can be used to solve for the desired unknown magnet positions and orientations $\vec{X} = (\vec{x}_1^P, \vec{m}_1, \ldots, \vec{x}_J^P, \vec{m}_J)^T$. Using a nonlinear least squares formulation, $$\min_{\vec{X}} f(\vec{X}), f(\vec{X}) = \|\vec{Y} - \vec{B}(\vec{X})\|^2$$

$\|\vec{Y} - \vec{B}(\vec{X})\|^2$ can be solved or inverted with reasonable initial guesses for $\vec{X}$ and assuming equal magnetic field measurement variance in each measurement channel. For small vibrations, the same initial guesses can be used for solving the displacements over time. A necessary condition for this problem to be well-posed is that the number of unknowns is less than or equal to the number of measurements. More measurements are desirable to help increase independent observations and decrease noise.

Although the simple dipole model captures many of the nonlinear behaviors, it does not capture all of the nonlinear effects in real systems. Differences between the model and real measurements can cause dramatic errors in the solutions and therefore more accurate alternative models are needed.

An illustrative embodiment of the present disclosure provides a calibrated local model solution. Alternative solutions such as creating full magnetic field maps or complex models using analytical, distributed monopole or multipole, and neural network techniques are also possible.

Since vibrations consist of small repetitive motions, a magnetic field model valid near the equilibrium point $\vec{X}_0$ of vibration can be constructed by a multi-variable Taylor series expansion $$\vec{B}_{ij}(\vec{X}) = \vec{B}_{ij}(\vec{X}_0) + D\vec{B}_{ij}(\vec{X}_0)[\vec{X} - \vec{X}_0] + \frac{1}{2!}[\vec{X} - \vec{X}_0]^T D^2\vec{B}_{ij}(\vec{X}_0)[\vec{X} - \vec{X}_0] + \ldots,$$

where $D\vec{B}_{ij}(\vec{X}_0)$ is the derivative and $D^2\vec{B}_{ij}(\vec{X}_0)$ is the second derivative tensor. This local model can then be combined with calibration measurements, which are taken by scanning either the sensors or the vibrating components through different positions and orientations near $\vec{X}_0$ sequentially for each magnet as it is inserted into the system.

An automated calibration system can be developed with moving stages to obtain the desired data. The calibration data can then be fit to the model to determine the constants within $\vec{B}_{ij}(\vec{X}_0)$, $D\vec{B}_{ij}(\vec{X}_0)$, and $D^2\vec{B}_{ij}(\vec{X}_0)$ and other higher order terms for each magnet in sequence producing a total of Q constants for each sensor axis and magnet combination. In many systems, the vibrational motion is constrained which simplifies $\vec{X}$ and reduces Q.

The local model approach is generated from calibration and thus can potentially be much more accurate than first-principles models like the dipole model or any model fitted to or simplified from first-principles models. In addition, knowledge of the absolute positions of the components is not needed as long as the sensors can be reliably scanned for calibration and repeatably placed. However, models with large numbers of degrees-of-freedom can be time-consuming to calibrate.

For the example depicted in FIGS. 2 and 3, the vibration is constrained to the z-direction and some secondary motion is expected in the y-direction. The motion of the beams is also limited to approximately ±5 mm. These factors limit the magnetic nonlinearities to a function of z and y allowing this system to be successfully modeled using parameters up to and including the third-order terms. This formulation up to third order contains Q=10 constants for each magnet and sensor axis combination. The total number of fitting constants for this system is 3IQJ. For the example illustrated in FIGS. 2 and 3, there are three magnets and five sensors (J=3,I=5). It is possible to reduce the number of constants by dropping sensor axes with low signal variation or reducing the order of the model.

Small inaccuracies in the time-domain fitting of vibrational component displacements can manifest as erroneous higher-order harmonics in the frequency domain. This is because nonlinearities in the time domain with a fundamental resonant frequency of $\omega$ will be converted into $2\omega, 3\omega, \ldots, P\omega$ in the frequency domain due to the properties of the Fourier transform. If not properly compensated, true and erroneous higher-order harmonics can be difficult to distinguish. Therefore it is desirable to choose more accurate nonlinear models, such as the calibrated local models, when analyzing vibration data in the frequency domain. In the ideal case, choosing up to an Pth order local model can reduce the magnitude of the undesirable "false" erroneous harmonics at $2\omega$ up to $P\omega$.

Prior to assembling a sensor system, the user constructs a simple dipole model with estimated locations of the sensors, vibrating components, and magnets to determine the fidelity of measurement. In addition, it is desirable to check force coupling for multiple magnets and determine the effect of electronic noise on inversion and the noise from correlated variables.

To check the force coupling for multiple magnets, the equation $F_j = M_0 V_j \nabla (\vec{B} \cdot \vec{m}_j)$ is used in conjunction with what is known about the stiffness of the vibrating components. The forced imposed by a magnet scales as $1/R^4$ and dies off quickly as a function of distance between the magnets. If the stiffness of the vibrating objects are known, it is possible to calculate the magnitude and direction of displacement imposed by nearby magnets. These forces can be mitigated by choosing the distance between magnets, the orientation of the magnets with respect to one another, and the size of the magnets. In the example depicted in FIGS. 2 and 3, the magnets are at least 25 mm apart and the maximum force generated by their interaction is 0.6 mN. For the beams used, the induced deflection is 7 μm at most, which is near the noise floor of the measurement.

For multiple magnets, it is desirable to know the optimal configuration of the magnets or sensors to minimize inversion noise. This can be estimated from the dipole model or from the local model after calibration. The nonlinear least squares formulation has an asymptotic error metric for the standard deviation of the estimated parameters $$\hat{\sigma} = \sigma_B \sqrt{\text{diag}(J_X^T J_X)^{-1}}$$

where $J_x$ is the Jacobian matrix of the magnet positions and orientations evaluated at $\vec{X}_0$. The measured magnetic field noise $\sigma_B$ comes from electronic measurement noise.

Numerical correlation can also occur between variables, especially for multiple magnets and multiple separate calibrations. Using the variance matrix $\vec{\in} = (Jx^T Jx)^{-1}$ the correlation matrix $$\rho_{np} = \frac{\epsilon_{np}}{\sqrt{\epsilon_{nn}\epsilon_{pp}}}$$

can be calculated. The influence of the correlation of the variable p on the variable n can be defined as $\rho_{np} X_p^{max}$, where $X_p^{max}$ is the maximum variation expected on each of the variables. An estimated metric for signal-to-noise caused by all correlated variables on a single variable n is $\hat{\zeta}_n^{min} = \rho_{nn} X_n^{max} / \Sigma_{p=1, p \neq n}^{N} |\rho_{np} X_p^{max}|$. This metric represents the worst-case scenario signal-to-correlation-noise amplitude ratio if all correlated signals happen to add constructively to degrade the signal. These metrics can be used to compare different experimental configurations prior to construction or prior to measurements.

Figure 5:
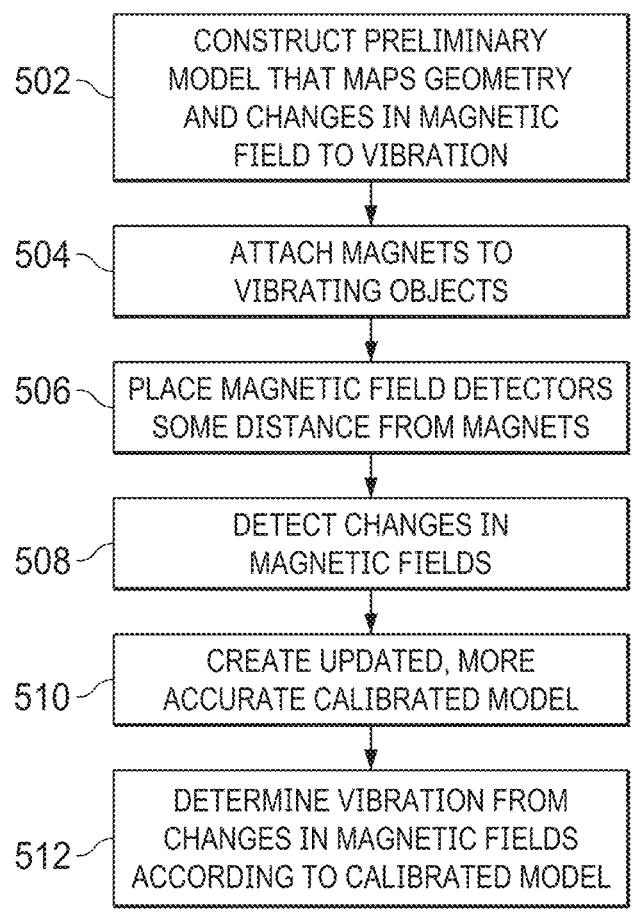
FIG. 5 is a flowcharting depicting a process for remotely sensing vibration in accordance with illustrative embodiments FIGS. 6A-6B graphically depict the results of magnetic tracking of three magnets on three vibrating beams in accordance with illustrative embodiments compared to video tracking FIGS. 7A-7D graphically depict the results of magnetic tracking of three magnets on a single vibrating beam for both an undamaged and damaged beam in accordance with illustrative embodiments FIGS. 8A-8B graphically depict the results of magnetic tracking of three magnets on a single vibrating beam through an opaque aluminum case in accordance with illustrative embodiments.

FIG. 5 is a flowchart depicting a process for remotely sensing vibration in accordance with illustrative embodiments. The process begins by constructing a preliminary model that maps geometry and changes in magnetic field to vibrations or spatial displacements (step 502). Estimates for force coupling, $\hat{\sigma}$, and $\hat{\zeta}_n^{min}$ can also be obtained in this step to optimize the placement and orientation of the sensors and magnetic, ferromagnetic, or paramagnetic components.

Next, magnets are attached to vibrating objects (step 504). Alternatively, trackable ferromagnetic or paramagnetic components can be placed on vibrating objects. In other implementations, the vibrating objects themselves can be magnetic, ferromagnetic or paramagnetic.

Magnetic field sensors are placed a specified distance from the magnets (step 506), which detect changes in the magnetic fields (step 508). A more accurate model can then be created and calibrated with the experimental setup (step 510) by scanning the sensor rig with respect to the vibrational components or vice versa.

The vibration or displacement of the vibrating objects is determined according to the more accurate calibrated model via numerical inversion techniques (step 512).

Figure 6B:
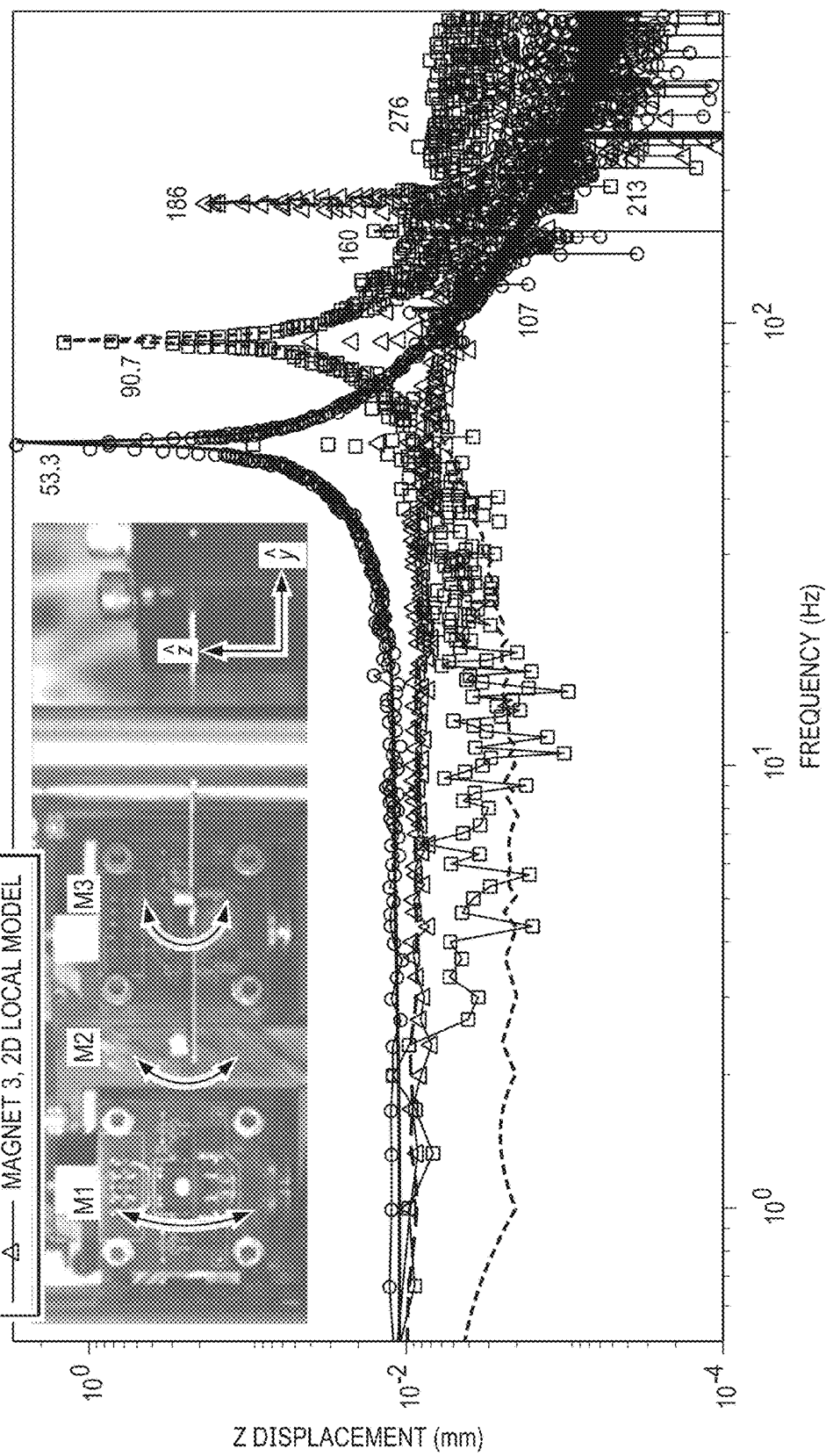

Results for the example depicted in FIGS. 2 and 3 are illustrated in FIGS. 6A and 6B. FIGS. 6A and 6B graphically depict the results of magnetic tracking of three magnets on three vibrating beams in accordance with illustrative embodiments compared to video tracking. Here, the three beams are simultaneously displaced and quickly released such that they oscillate at their respective natural frequencies. The raw magnetic field measurements are inverted via a 2D (two degrees-of-freedom in z and y) calibrated local model and these results are compared with video tracking with a high speed camera, showing that the two techniques match fairly well. Only the z-axis tracking is illustrated here. The top figure shows the results in the time domain while the bottom figure shows the results in the frequency domain. In addition to the fundamental frequencies of each beam, some correlated noise and erroneous higher-order frequencies can be noted in the frequency domain plot. These results illustrate the operation of the remote vibration sensing technique via magnetic field sensing.

Figure 7A:
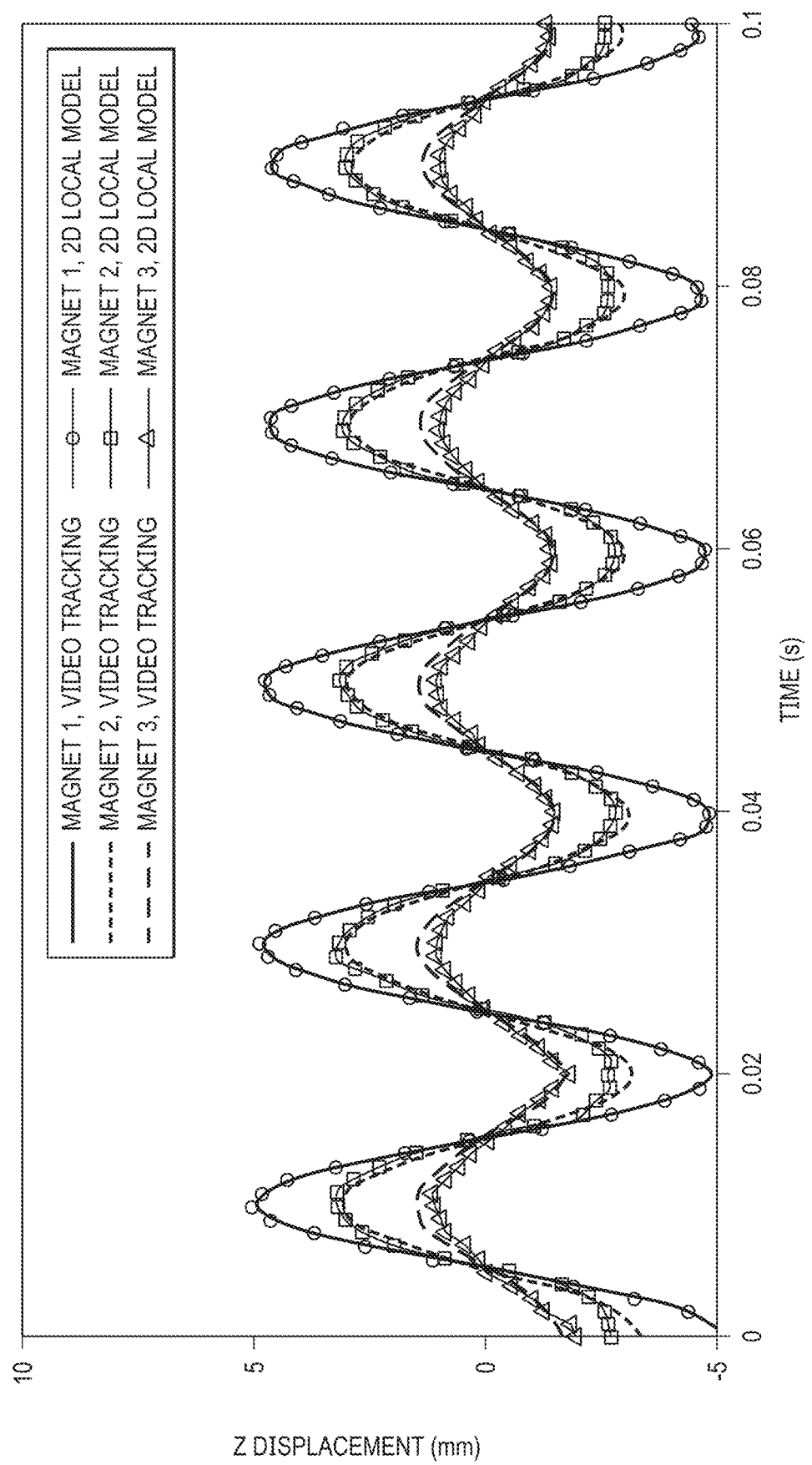
Figure 7B:
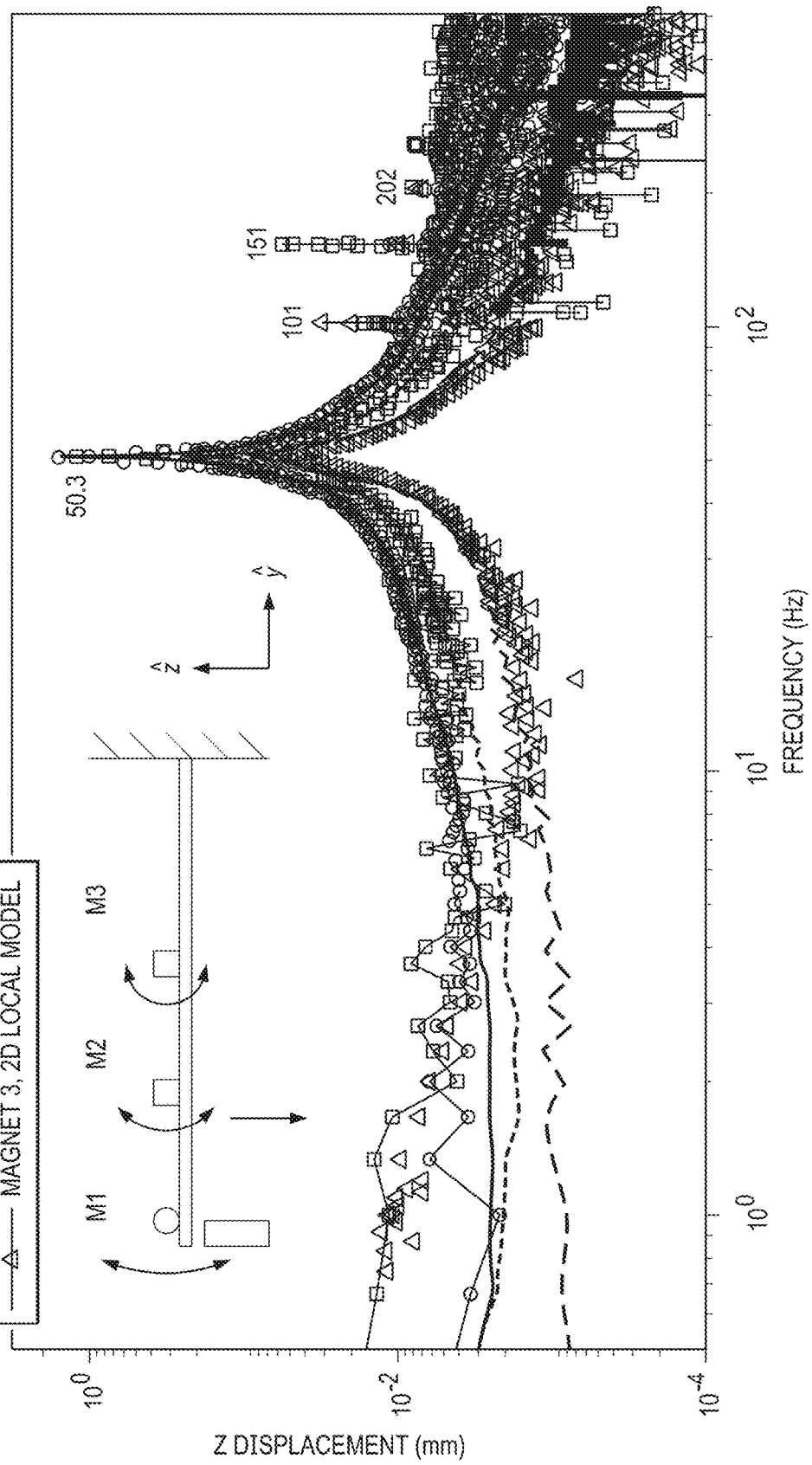
Figure 7C:
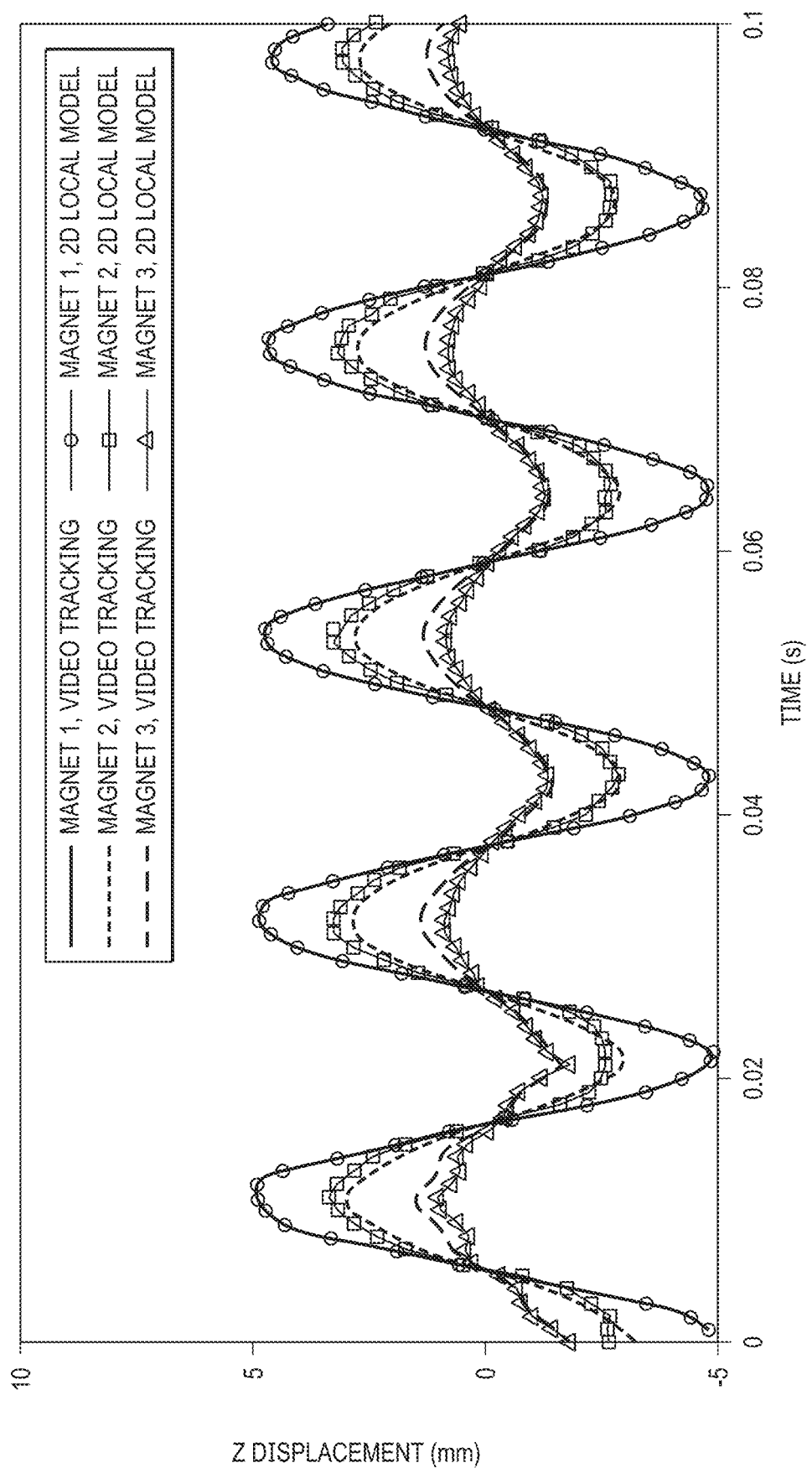
Figure 7D:
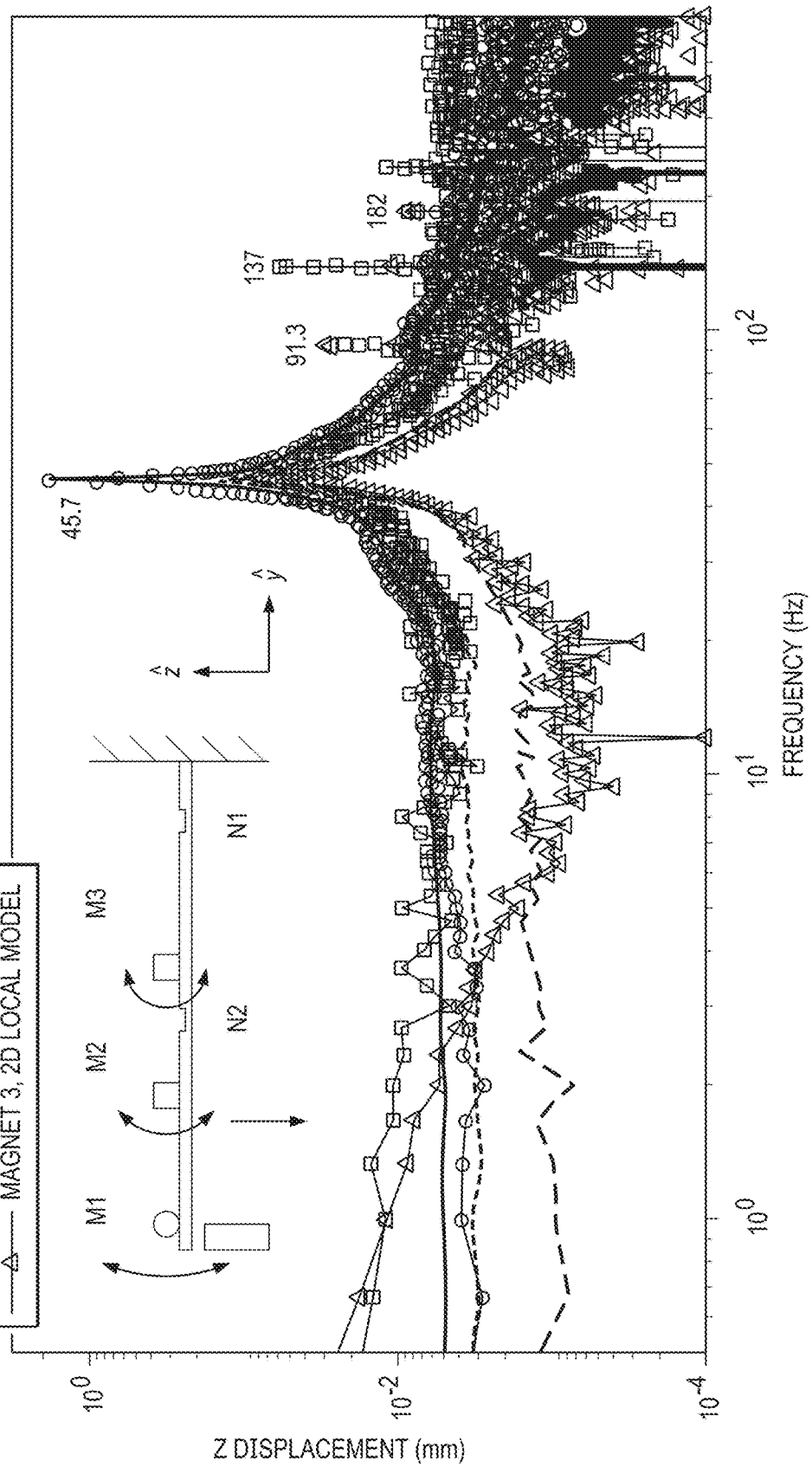

FIGS. 7A-7D graphically depict the results of magnetic tracking of three magnets on a single vibrating beam for both an undamaged and a damaged beam in accordance with illustrative embodiments. The graphs in FIGS. 7A and 7B show the motion of the undamaged beam, while the graphs FIGS. 7C and 7D show the motion of the beam with two notches cut at N1 and N2. The difference in vibrational frequencies can be noted as well as changes in the shape of the time-domain curves (which indicate changes in the modes and mode shapes).

Figure 8A:
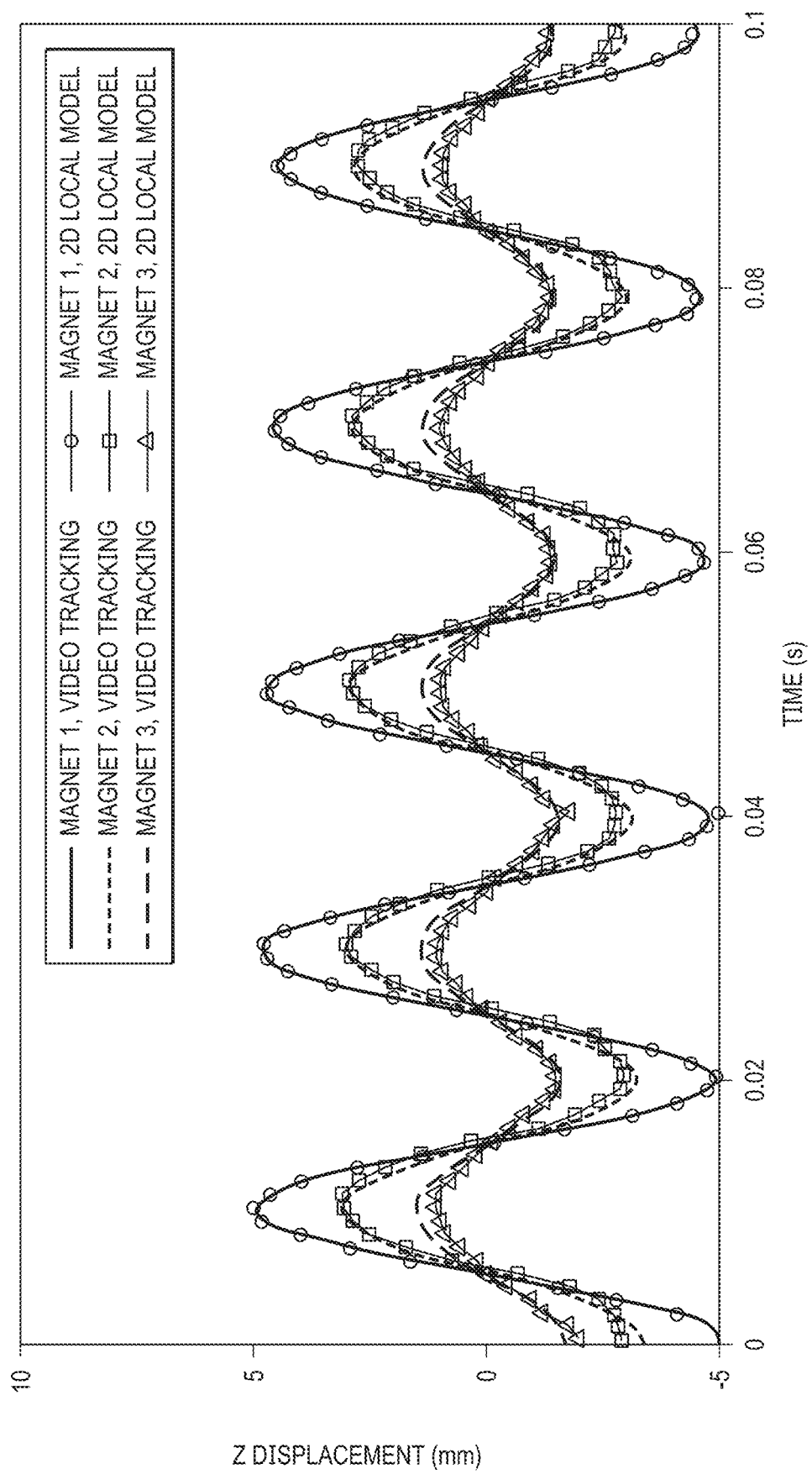
Figure 8B:
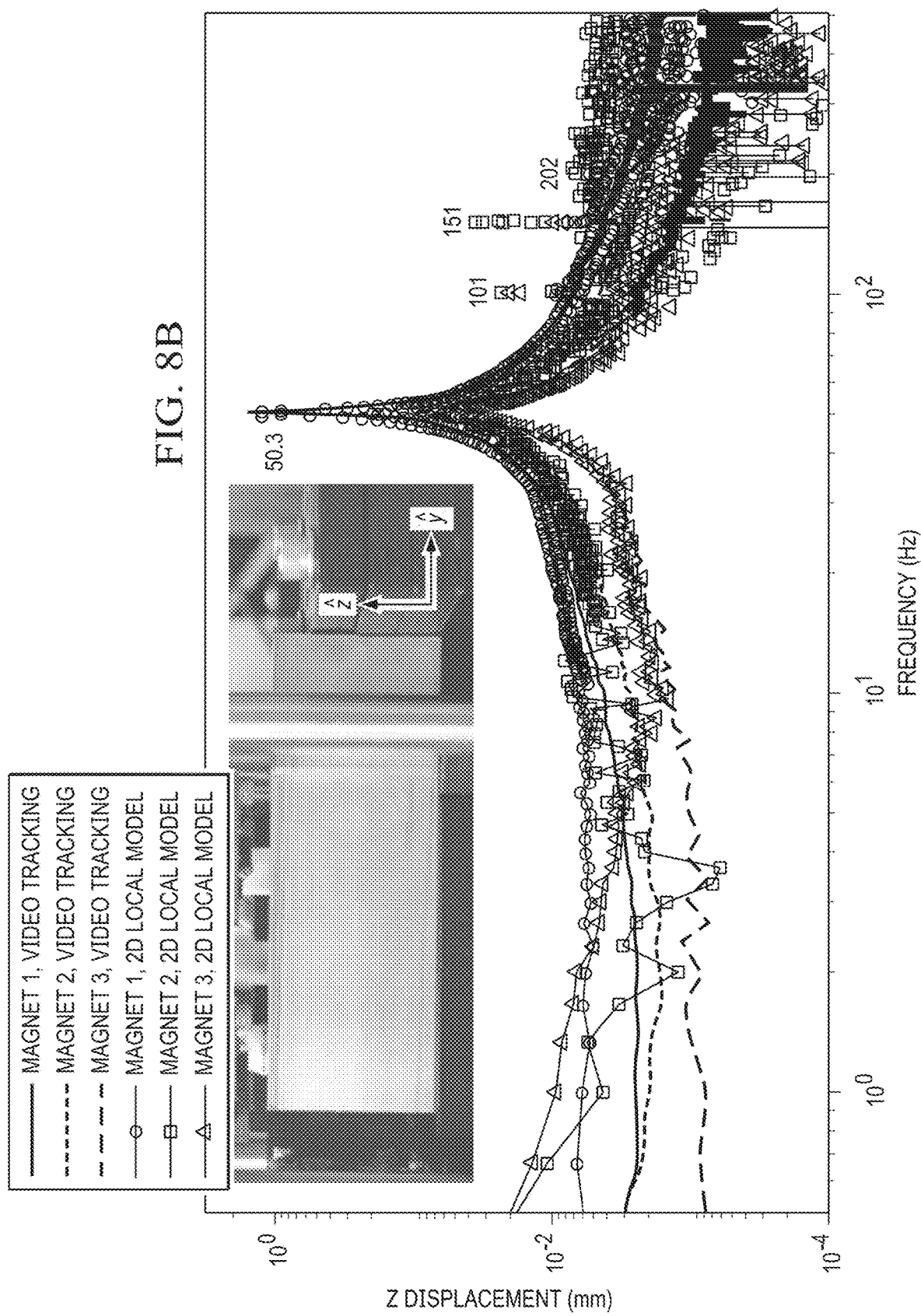

FIGS. 8A and 8B graphically depict the results of magnetic tracking three magnets on a single vibrating beam through an aluminum case in accordance with illustrative embodiments. The arrangement with three magnets placed on a single undamaged beam is placed inside an aluminum box to make the system optically opaque but magnetically transparent. Even without optical access, the magnetic tracking system is able to measure the motion of the beam accurately when compared with video taken from a separate test with the aluminum box removed. This example illustrates the effectiveness of the technique in the present disclosure for remote wireless sensing of vibrations in optically opaque systems.

Figure 9:
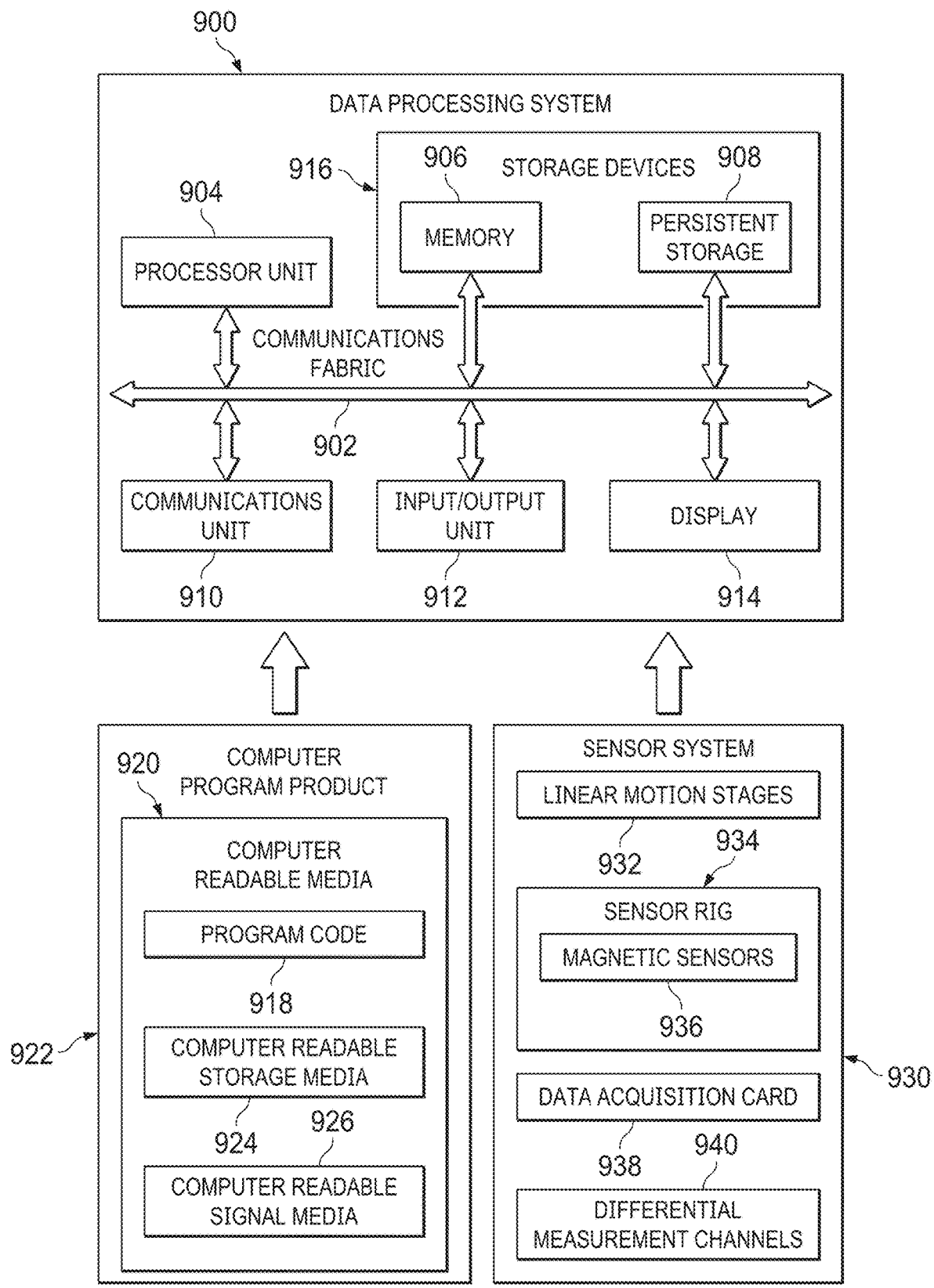
FIG. 9 is a diagram of a data processing system depicted in accordance with an illustrative embodiment.

Turning to FIG. 9, a diagram of a data processing system is depicted in accordance with an illustrative embodiment. Data processing system 900 is an example of a system in which computer-readable program code or program instructions implementing processes of illustrative embodiments may be run. In this illustrative example, data processing system 900 includes communications fabric 902, which provides communications between processor unit 904, memory 906, persistent storage 908, communications unit 910, input/output unit 912, and display 914.

Processor unit 904 serves to execute instructions for software applications and programs that may be loaded into memory 906. Processor unit 904 may be a set of one or more hardware processor devices or may be a multi-processor core, depending on the particular implementation. Further, processor unit 904 may be implemented using one or more heterogeneous processor systems, in which a main processor is present with secondary processors on a single chip. As another illustrative example, processor unit 904 may be a symmetric multi-processor system containing multiple processors of the same type.

A computer-readable storage device is any piece of hardware that is capable of storing information, such as, for example, without limitation, data, computer-readable program code in functional form, and/or other suitable information either on a transient basis and/or a persistent basis. Further, a computer-readable storage device excludes a propagation medium. Memory 906, in these examples, may be, for example, a random access memory, or any other suitable volatile or non-volatile storage device. Persistent storage 908 may take various forms, depending on the particular implementation. For example, persistent storage 908 may contain one or more devices. For example, persistent storage 908 may be a hard drive, a flash memory, a rewritable optical disk, a rewritable magnetic tape, or some combination of the above. The media used by persistent storage 908 may be removable. For example, a removable hard drive may be used for persistent storage 908.

Communications unit 910, in this example, provides for communication with other computers, data processing systems, and devices via network communications unit 910 may provide communications using both physical and wireless communications links. The physical communications link may utilize, for example, a wire, cable, universal serial bus, or any other physical technology to establish a physical communications link for data processing system 900. The wireless communications link may utilize, for example, shortwave, high frequency, ultra-high frequency, microwave, wireless fidelity (WiFi), Bluetooth technology, global system for mobile communications (GSM), code division multiple access (CDMA), second-generation (2G), third-generation (3G), fourth-generation (4G), 4G Long Term Evolution (LTE), LTE Advanced, or any other wireless communication technology or standard to establish a wireless communications link for data processing system 900.

Input/output unit 912 allows for the input and output of data with other devices that may be connected to data processing system 900. For example, input/output unit 912 may provide a connection for user input through a keypad, keyboard, and/or some other suitable input device. Display 914 provides a mechanism to display information to a user and may include touch screen capabilities to allow the user to make on-screen selections through user interfaces or input data, for example.

Instructions for the operating system, applications, and/or programs may be located in storage devices 916, which are in communication with processor unit 904 through communications fabric 902. In this illustrative example, the instructions are in a functional form on persistent storage 908. These instructions may be loaded into memory 906 for running by processor unit 904. The processes of the different embodiments may be performed by processor unit 904 using computer-implemented program instructions, which may be located in a memory, such as memory 906. These program instructions are referred to as program code, computer-usable program code, or computer-readable program code that may be read and run by a processor in processor unit 904. The program code, in the different embodiments, may be embodied on different physical computer-readable storage devices, such as memory 906 or persistent storage 908.

Program code 918 is located in a functional form on computer-readable media 920 that is selectively removable and may be loaded onto or transferred to data processing system 900 for running by processor unit 904. Program code 918 and computer-readable media 920 form computer program product 922. In one example, computer-readable media 920 may be computer-readable storage media 924 or computer-readable signal media 926. Computer-readable storage media 924 may include, for example, an optical or magnetic disc that is inserted or placed into a drive or other device that is part of persistent storage 908 for transfer onto a storage device, such as a hard drive, that is part of persistent storage 908. Computer-readable storage media 924 also may take the form of a persistent storage, such as a hard drive, a thumb drive, or a flash memory that is connected to data processing system 900. In some instances, computer-readable storage media 924 may not be removable from data processing system 900.

Alternatively, program code 918 may be transferred to data processing system 900 using computer-readable signal media 926. Computer-readable signal media 926 may be, for example, a propagated data signal containing program code 918. For example, computer-readable signal media 926 may be an electro-magnetic signal, an optical signal, and/or any other suitable type of signal. These signals may be transmitted over communication links, such as wireless communication links, an optical fiber cable, a coaxial cable, a wire, and/or any other suitable type of communications link. In other words, the communications link and/or the connection may be physical or wireless in the illustrative examples. The computer-readable media also may take the form of non-tangible media, such as communication links or wireless transmissions containing the program code.

In some illustrative embodiments, program code 918 may be downloaded over a network to persistent storage 908 from another device or data processing system through computer-readable signal media 926 for use within data processing system 900. For instance, program code stored in a computer-readable storage media in a data processing system may be downloaded over a network from the data processing system to data processing system 900. The data processing system providing program code 918 may be a server computer, a client computer, or some other device capable of storing and transmitting program code 918.

Input to data processing system 900 can be provided by a sensor system 930. The sensor system comprises a number of magnetic sensors 936 that are attached to a sensor rig 934. The sensor rig 934 is attached to linear motion stages 932 to enable x-, y-, and z-direction scanning of for magnetic field calibrations.

The magnetic sensors 936 are connected via to a custom board that interfaces with a data acquisition card 938 and differential analog measurement channels 940.

The different components illustrated for data processing system 900 are not meant to provide architectural limitations to the manner in which different embodiments may be implemented. The different illustrative embodiments may be implemented in a data processing system including components in addition to, or in place of, those illustrated for data processing system 900. Other components shown in FIG. 9 can be varied from the illustrative examples shown. The different embodiments may be implemented using any hardware device or system capable of executing program code. As one example, data processing system 900 may include organic components integrated with inorganic components and/or may be comprised entirely of organic components excluding a human being. For example, a storage device may be comprised of an organic semiconductor.

As another example, a computer-readable storage device in data processing system 900 is any hardware apparatus that may store data. Memory 906, persistent storage 908, and computer-readable storage media 924 are examples of physical storage devices in a tangible form.

In another example, a bus system may be used to implement communications fabric 902 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 906 or a cache such as found in an interface and memory controller hub that may be present in communications fabric 902.

The present invention may be a system, a method, and/or a computer program product. The computer program product may include a computer-readable storage medium or media having computer-readable program instructions thereon for causing a processor to carry out aspects of the present invention.

The computer-readable storage medium can be a tangible device that can retain and store instructions for use by an instruction execution device. The computer-readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer-readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer-readable program instructions described herein can be downloaded to respective computing/processing devices from a computer-readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer-readable program instructions from the network and forwards the computer-readable program instructions for storage in a computer-readable storage medium within the respective computing/processing device.

Computer-readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer-readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer-readable program instructions by utilizing state information of the computer readable program instructions to personalize the electronic circuitry, in order to perform aspects of the present invention.

The flowchart and block diagrams in the different depicted embodiments illustrate the architecture, functionality, and operation of some possible implementations of apparatuses and methods in an illustrative embodiment. In this regard, each block in the flowchart or block diagrams may represent at least one of a module, a segment, a function, or a portion of an operation or step. For example, one or more of the blocks may be implemented as program code, hardware, or a combination of the program code and hardware. When implemented in hardware, the hardware may, for example, take the form of integrated circuits that are manufactured or configured to perform one or more operations in the flowcharts or block diagrams. When implemented as a combination of program code and hardware, the implementation may take the form of firmware. Each block in the flowchart or the block diagrams may be implemented using special purpose hardware systems that perform the different operations or combinations of special purpose hardware and program code run by the special purpose hardware. Some steps of the process may be implemented by an additive manufacturing machine such as, for example, a 3D printer.

In some alternative implementations of an illustrative embodiment, the function or functions noted in the blocks may occur out of the order noted in the figure. For example, in some cases, two blocks shown in succession may be performed substantially concurrently, or the blocks may sometimes be performed in the reverse order, depending upon the functionality involved. Also, other blocks may be added in addition to the illustrated blocks in a flowchart or block diagram.

Detailed embodiments of the claimed structures and methods are disclosed herein; however, it is to be understood that the disclosed embodiments are merely illustrative of the claimed structures and methods that may be embodied in various forms. In addition, each of the examples given in connection with the various embodiments is intended to be illustrative, and not restrictive.

Further, the figures are not necessarily to scale, some features may be exaggerated to show details of particular components. Therefore, specific structural and functional details disclosed herein are not to be interpreted as limiting, but merely as a representative basis for teaching one skilled in the art to variously employ the methods and structures of the present disclosure.

As used herein, the phrase "a number" means one or more. The phrase "at least one of", when used with a list of items, means different combinations of one or more of the listed items may be used, and only one of each item in the list may be needed. In other words, "at least one of" means any combination of items and number of items may be used from the list, but not all of the items in the list are required. The item may be a particular object, a thing, or a category.

For example, without limitation, "at least one of item A, item B, or item C" may include item A, item A and item B, or item C. This example also may include item A, item B, and item C or item B and item C. Of course, any combinations of these items may be present. In some illustrative examples, "at least one of" may be, for example, without limitation, two of item A; one of item B; and ten of item C; four of item B and seven of item C; or other suitable combinations.

For purposes of the description hereinafter, the terms "upper," "lower," "right," "left," "vertical," "horizontal," "top," "bottom," and derivatives thereof shall relate to the embodiments of the disclosure, as it is oriented in the drawing figures. The terms "positioned on" means that a first element, such as a first structure, is present on a second element, such as a second structure, wherein intervening elements, such as an interface structure, e.g. interface layer, may be present between the first element and the second element.

In this disclosure, when an element, such as a layer, region, or substrate is referred to as being "on" or "over"

another element, the element can be directly on the other element or intervening elements can also be present. In contrast, when an element is referred to as being "directly on," "directly over," or "on and in direct contact with" another element, there are no intervening elements present, and the element is in contact with another element.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiment. The terminology used herein was chosen to best explain the principles of the embodiment, the practical application or technical improvement over technologies found in the marketplace, or to enable others of ordinary skill in the art to understand the embodiments disclosed here.

What is claimed is:

1. A method of sensing vibrations or displacements remotely, comprising:
   attaching a number of magnets to a number of vibrating objects;
   placing a number of magnetic field sensors a specified distance from the number of magnets;
   detecting, by the number of magnetic field sensors, changes in a magnetic field;
   determining, by a number of processors, vibrational displacement of the number of vibrating objects according to a model that maps changes in the magnetic field to vibrations or spatial displacement; and
   detecting a damage or a degradation to an object in the number of vibrating objects by detecting shifts in a natural frequency and changes in mode shapes of the number of vibrating objects.

2. The method of claim 1, wherein the number of magnets comprise at least one of:
   permanent magnets;
   ferromagnets;
   paramagnets.

3. The method of claim 1, further comprising deriving the model via one of the follow ways:
   directly from first principles;
   simplified from a first principles model; or
   fitted from a first principles model.

4. The method of claim 3, wherein the first principles comprise a dipole model.

5. The method of claim 1, wherein the model is a single or multiple degree-of-freedom calibrated local model created by mapping displacements of the number of magnets with changes in the magnetic field.

6. The method of claim 1, wherein the vibrations or spatial displacement are determined from the model via single or multiple degree-of-freedom linear or nonlinear inversion techniques.

7. The method of claim 1, wherein the number of magnetic field sensors comprise three-axis magnetic field sensors.

8. The method of claim 1, wherein multiple magnets are attached to a single vibrating object.

9. The method of claim 1, wherein multiple magnets are attached to multiple vibrating objects.

10. The method of claim 1, wherein the number of magnets and vibrating objects are located inside a vessel, and the number of magnetic field sensors are located outside the vessel, wherein the vessel is magnetically transparent.

11. The method of claim 10, wherein the vessel is optically opaque.

12. A method of remotely sensing vibrations or displacements, the method comprising:
    positioning a number of magnetic vibrating objects;
    placing a number of magnetic field sensors a specified distance from the number of magnetic vibrating objects;
    detecting, by the number of magnetic field sensors, changes in a magnetic field;
    determining, by a number of processors, a vibrational displacement of the number of magnetic vibrating objects according to a model mapping changes in the magnetic field to the vibrations or displacements; and
    detecting a damage or a degradation to an object in the number of magnetic vibrating objects by detecting shifts in a natural frequency and changes in mode shapes of the number of magnetic vibrating objects.

13. The method of claim 12, wherein the number of magnetic vibrating objects are at least one of:
    permanents magnets;
    ferromagnetic;
    paramagnetic.

14. The method of claim 12, further comprising deriving the model in one of the follow ways:
    directly from first principles;
    simplified from first a first principles model; or
    fitted from a first principles model.

15. The method of claim 14, wherein the first principles comprise a dipole model.

16. The method of claim 12, wherein the model is a single or multiple degree-of-freedom calibrated local model created by mapping displacements of ferromagnetic or paramagnetic objects with changes in the magnetic field.

17. The method of claim 12, wherein the vibrations or displacements are determined from the model via single or multiple degree-of-freedom linear or nonlinear inversion techniques.

18. The method of claim 12, wherein the number of magnetic field sensors are three-axis magnetic field sensors.

19. The method of claim 12, wherein the number of magnetic vibrating objects are located inside a vessel, and the number of magnetic field sensors are located outside the vessel, wherein the vessel is magnetically transparent.

20. A method of remotely sensing vibrations or displacements, the method comprising:
    positioning a number of magnetic vibrating objects inside a vessel that is optically opaque and magnetically transparent;
    placing a number of magnetic field sensors outside the vessel a specified distance from the number of magnetic vibrating objects;
    detecting, by the number of magnetic field sensors, changes in a magnetic field;
    determining, by a number of processors, a vibrational displacement of the number of magnetic vibrating objects according to a model mapping changes in the magnetic field to the vibrations or displacements.

* * * * *